United States Patent [19]
Beakley et al.

[11] Patent Number: 5,288,005
[45] Date of Patent: Feb. 22, 1994

[54] AUTOMATIC INTERNAL PIPE LINE-UP CLAMP

[76] Inventors: Lane D. Beakley, 22702 Carter Moir, Katy, Tex. 77449; Jerry P. Christopher, 14319 Stillmeadow, Houston, Tex. 77079

[21] Appl. No.: 941,205

[22] Filed: Sep. 4, 1992

[51] Int. Cl.⁵ .............................. B23K 37/04
[52] U.S. Cl. ................................. 228/49.3
[58] Field of Search ..................... 228/49.3, 44.5

[56] References Cited

U.S. PATENT DOCUMENTS

| | | | |
|---|---|---|---|
| 3,259,964 | 7/1966 | Engel | 228/49.3 X |
| 3,369,725 | 2/1968 | Thomas et al. | 228/49.3 X |
| 3,561,320 | 2/1971 | Nelson | 228/49.3 X |
| 4,140,262 | 2/1979 | Wilson et al. | 228/49.3 |

*Primary Examiner*—Kenneth J. Ramsey
*Attorney, Agent, or Firm*—Bill B. Berryhill

[57] ABSTRACT

Apparatus for end-to-end alignment of first and second sections of pipe for the welding together thereof including a frame assembly carrying independently expandable and retractable first and second axially spaced clamps for engagement and disengagement with the interior walls of said pipe sections. The frame assembly also carries a drive assembly by which the apparatus is propelled through said pipe sections and a brake assembly to slow or stop movement of the apparatus therein. Controls are connected to the clamps, the drive assembly and the brake assembly which are responsive to sensing of the end of the first pipe section by a sensor to deactivate the drive assembly, activate the brake assembly, arrest movement of the apparatus and, upon predetermined alignment, to activate the first clamp and finally the second clamp for engagement with the walls of the pipe sections.

12 Claims, 3 Drawing Sheets

AUTOMATIC INTERNAL PIPE LINE-UP CLAMP

BACKGROUND OF THE INVENTION

1. Field of the invention

The present invention pertains to pipe welding apparatus. More specifically, the present invention pertains to internal clamps for aligning pipe sections in end-to-end relationship for welding. In particular, the present invention pertains to internal line-up clamps suitable for welding pipe in cross-country pipe lines.

2. Description of the Prior Art

Pipe lines, of course, have been used for many years to transfer fluid products from one point to another. Many of these pipe lines are several hundred miles long. This is especially true of pipe lines which transport hydrocarbon products, gas, oil, gasoline, etc. Typically, such pipe lines are formed of pipe sections which are welded end-to-end as they are installed along a pipe line right-of-way. Such cross-country pipe lines may vary in diameter from eight inches to sixty inches and even more.

In welding one pipe section to another, it is important that the adjacent ends of the pipe sections being welded be coaxially aligned and that the pipe be as near to a true circle as possible. For this reason, internal pipe clamps have been developed for aligning and holding contiguous pipe sections while they are being welded together. A typical internal pipe line-up clamp of the prior art is shown in U.S. Pat. No. 3,044,431. Such line-up clamps typically include a frame assembly which support a pair of axially spaced and radially expandable clamp assemblies. The frame assembly usually carries some source of fluid pressure, typically a pressurized air tank, which provides the force necessary for operating various components of the clamp. Some type of drive apparatus is usually supported by the frame assembly for propelling the clamp apparatus through sections of pipe as the pipe is joined together by welding. Controls for operation of the line-up clamp are typically placed at the front of the clamp where they may be reached for manual operation. In some cases, e.g. after welding is finished at a joint between two pipe sections, the controls are not within reach. For these situations, a mechanism is provided which may include a long handle or reach rod which extends to and slightly beyond the forward end of the last pipe section so that the controls may be manipulated by an individual standing at the forward end of the last pipe section. Most, if not all, of the currently used pipe line-up clamps operate in this fashion. Other such examples of the prior art may be seen in U.S. Pat. Nos. 3,425,614 and 4,140,262. While these designs vary somewhat, particularly in the design of the clamping assemblies, they operate in the same general manner.

An internal pipe line-up clamp of the prior art typically operates in the following manner. After welding of a pipe joint, the clamp assemblies are retracted by manipulating the long reach rod which slightly extends from the end of the last pipe joint. Then the drive mechanism is actuated, using the reach rod, causing the line-up clamp to be propelled forwardly through the last pipe joint. As this occurs, the operator must be careful to place the distal or free end of the reach rod within the next pipe section to be welded to the pipe line. Initially, however, enough space must be provided between the end of the last welded pipe section and the next one to be welded thereto so that the operators may control the operation of the internal pipe line-up clamp being propelled toward them.

Typically, the line-up clamp of the prior art is also provided with a pair of cables which extend forward of the line-up clamp for a distance considerably shorter than the reach rod which extends through the next pipe joint. One of these cables is attached to a control device which deactivates the drive motor and the other is attached to a braking device or a motor reversing device. As the line-up clamp approaches the end of the last welded pipe section, these two cables exit the end of the pipe section where they must be grabbed by a worker. Usually one worker grabs the drive cable, deactivating the drive motor, and another worker grabs the brake or reverse motor drive cable, activating the brake assembly (or reversing the drive motor) to arrest the forward movement of the line-up clamp. The length of the control cables are designed so that skilled workers may stop the line-up clamp just short of being ejected from the pipe section. The workers then, by manipulation of accessible controls, position the line-up clamp forwardly or rearwardly so that the rearmost clamp assembly is properly positioned just inside the last welded pipe section. Then the rearmost clamp assembly is expanded for clamping engagement with the interior walls of the last welded pipe section.

After movement of the line-up clamp has been arrested and the rearmost clamp assembly expanded, the next pipe section to be welded to the pipe line is slid over the forward end of the line-up clamp and aligned end-to-end with the last welded pipe section until the two pipe sections are properly spaced for the welding together thereof. At this time, the forwardmost clamp assembly is positioned internally of the next pipe section to be welded to the pipe line. Then by manipulating the reach rod which extends from the front of the line-up clamp through the pipe section to be welded, the forwardmost clamp assembly is actuated expanding into clamping engagement with the interior walls of the pipe section to be welded. With expansion of both clamp assemblies, the ends of the two pipe sections to be joined are coaxially aligned and the walls are forced into true circular alignment. The welding of the pipe sections then proceeds. After the welding joint is completed, both clamp assemblies are retracted by manipulation of the reach rod, the drive mechanism is activated and the cycle repeated for another section of pipe.

These internal pipe line-up clamps are quite heavy, some of the larger sizes typically weighing four to five thousand pounds. In addition, they may be propelled through the pipe line at speeds approaching six feet per second and if on a downwardly inclined grade move even faster. From the previously described typical operation of pipe line-up clamps of the prior art, it can be easily understood that the workers who work with such clamps are subjected to possible injury or even death if the movement of the clamp is not arrested in time to prevent it being driven from the end of the last welded pipe section. Even though a worker is not injured by the line-up clamp itself, the long reach rod which extends through the next pipe section to be welded and the control cables associated with the drive mechanism and the brakes are potentially hazardous.

Even if a worker is not injured when movement of the line-up clamp fails to be arrested in time, there are other problems associated with ejection of the line-up clamp from the end of the last welded pipe section. Such ejection may cause damage to the line-up clamp requiring repair or replacement thereof. In addition, the clamp must be lifted and placed back in the pipe section from which it was ejected. Since these line-up clamps are extremely heavy, some as much as several thousand pounds, heavy lifting equipment and considerable time are required. Loss of time may seriously affect the profits of a pipe line contractor, many of whom bid their jobs on the basis of completing a weld every three or four minutes.

In an attempt to overcome some of the deficiencies of line-up clamps of the prior art, particularly the possibility of the line-up clamp being ejected from the end of the last welded pipe section, additional protections have been sought. For example, U.S. Pat. No. 3,462,059 discloses a line-up clamp which is provided with a lever which pivots downwardly as the line-up clamp begins to exit the end of the pipe. As it pivots, the speed of the device which propels the line-up clamp through the pipe is reduced. After a little further movement another lever exits the pipe and pivots downwardly shifting the drive mechanism to a reverse position and with the aid of a stop mechanism is supposed to align the clamp for expansion of the rear clamping assembly. While the purpose of these mechanisms is to solve the aforementioned problems, it is doubtful this has been accomplished since this type of line-up clamp is not generally known and has not apparently met with commercial success. This may be due to the fact that with the speeds and momentum involved in pipe line-up clamps, the operation and control of this prior art design may not have been fast enough.

Pipe line-up clamps of the prior art, including those presently used, have been effective for many years in welding pipe sections. However, they are potentially hazardous in operation and in some cases may result in lost time. Thus, improvements in the operation, safety and efficiency of such pipe line-up clamps are much needed and sought.

SUMMARY OF THE PRESENT INVENTION

The present invention provides apparatus for end-to-end alignment of first and second sections of pipe for the welding together thereof. The apparatus may include a frame assembly for supporting various components of the apparatus within the pipe sections. A composite clamp assembly, including first and second clamps, is carried by the frame assembly, each of the first and second clamps being independently expandable and retractable for clamping engagement with or disengagement from the interior walls of the pipe sections, respectively. A motor driven wheel is carried by the frame assembly for engagement with the interior walls of the pipe sections to propel the apparatus forwardly or rearwardly therein. The apparatus also includes brakes which are activatable for frictional engagement with the interior walls of the pipe sections to slow or stop movement of the apparatus therein.

A sensor is provided for sensing the end of the first pipe section as the apparatus is propelled forwardly therethrough and controls connected with the first and second clamps, the drive wheel motor and the brakes are provided for response to the sensing of the end of the first pipe section to deactivate the drive wheel motor, activate the brakes and arrest forward movement of the apparatus through the first pipe section. The apparatus is also provided with a reverse stop device which is engageable with the end of the first pipe section, upon deactivation of the brake and reactivation of the drive wheel motor for rearward movement, to align the apparatus at a pre-determined position within the first pipe section, after which the controls automatically expand the first clamp. After end-to-end alignment of a second pipe section with the first pipe section, the second clamp is expanded for clamping engagement with the interior walls of a second pipe section so that welding may proceed.

In a preferred embodiment of the invention, the power to the drive wheel motor, brakes and clamps is provided by compressed air carried in a compressed air tank on the frame of the apparatus. Unique pneumatic controls, including a pneumatic logic circuit, provides essentially automatic operation of the apparatus to initiate travel from one weld joint to the end of the last welded pipe section, arrest of movement thereof and, after predetermined time, to expand the first clamp. After the next to be welded pipe section is aligned end-to-end with the last welded pipe section, the second clamp may be remotely expanded to allow welding of the next joint. The cycle may then be repeated.

The apparatus of the present invention provides a means by which pipes may be aligned end-to-end and placed in true circular alignment with a pipe line-up clamp which does not have the inherent problems and hazards associated with pipe line-up clamps of the prior art. Movement of the pipe line-up clamp is automatically arrested as it begins to exit a pipe section preventing premature ejection of the pipe line-up clamp from the pipe, essentially eliminating injury to personnel and lost time due to retrieving and/or repairing a prematurely ejected line-up clamp. The apparatus is easily operated, may be easily manipulated when needed and may be operated from a remote location when desired. Many other objects and advantages of the invention will be understood after reading the description which follows in conjunction with the accompanying drawings.

DESCRIPTION OF A PREFERRED EMBODIMENT OF THE INVENTION

Figure 1:
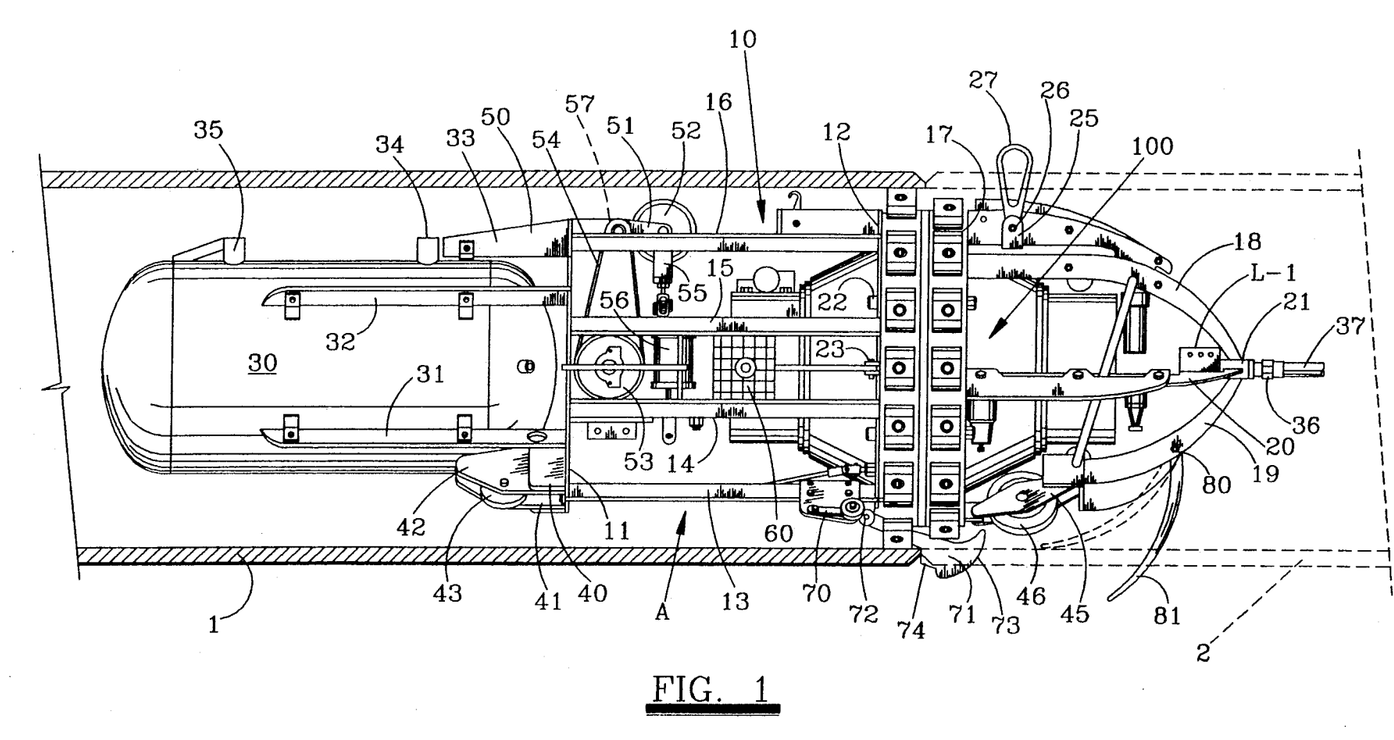
FIG. 1 is a side elevation view, partially in section, showing an internal pipe line-up clamp for aligning first and second sections of pipe, according to a preferred embodiment of the invention.

Referring first to FIG. 1, there is shown clamp apparatus A for end-to-end alignment of first and second sections of pipe 1, 2 for the welding together thereof. The clamp apparatus A includes a frame assembly 10 for the supporting the apparatus and the components thereof internally within the pipe sections 1 and 2. The frame assembly 10 includes a circular plate 11 and an annular ring 12 connected by longitudinal structural members 13, 14, 15, 16 which are parallel to the central axis of the clamp apparatus A. The frame assembly 10 also includes a nose portion which includes an annular ring 17 from which projects support and guide bars 18, 19, 20 which curve inwardly toward a nose fitting 21. Fastened between the rings 12 and 17 of the frame assembly by bolts 22, 23 etc. is a composite clamping assembly 100 which will be described in greater detail hereafter. Connected to the nose portion of the frame assembly 10 by bracket 25 and pivot pin 26 is a lift fitting 27 by which the entire clamp apparatus A may be lifted if required. Several brackets 31, 32, 33 project rearwardly from the frame assembly plate 11 to support an air tank 30 in which pressurized air may be stored for operating various components of the clamp apparatus A. The tank 30 may be provided with fittings 34, 35 for filling the tank 30 with compressed air or other pressurized gasses. In addition, the air tank 30 may be connected by a conduit (not shown) to a fitting 36 at the nose of the apparatus which may be directly connected or connected through an extension conduit 37 to a source of compressed air or pressurized gas. The tank 30 is also connected through various conduits and fittings (not shown) to other components of the appratus A such as air motors, air brakes, piston operated clamping assemblies and various air controls as will be more fully understood hereafter.

Welded to circular plate 11 at angular disposition are two pair of brackets 40, 41, each of which supports a wheel-mounting assembly 42 and a corresponding wheel 43. Thus, a pair of wheels 43 project downwardly and outwardly from the clamp assembly A, on opposite sides of a vertical plane, for supporting the apparatus A within the pipe sections 1 and 2. In addition, a pair of wheel-mounting brackets 45 are affixed to the forward part of the frame assembly 10 to support a pair of wheels 46 which project downwardly and outwardly, on opposite sides of the vertical plane, to support a portion of the clamp apparatus A within the pipe sections 1 and 2. The brackets 40, 41, 42, 45 and wheels 43, 46 are sized so that, with the apparatus A resting thereon within pipe sections 1 and 2, the clamp apparatus A is centrally located therein.

Attached to the upper portion of circular plate 11 is a pair of brackets 50 which support a pair of pivotable arms 51 which in turn carry a pair of drive wheels 52. The drive wheels 52 may be driven in any suitable manner. As shown an air motor 53 is connected by a drive chain 54 to a corresponding sprocket (not shown) carried between brackets 50. This sprocket is connected by another chain 57 (dotted line) to a drive sprocket mounted between the pair of drive wheels 52. If desired, the distal ends of the arms 51 may be connected by a yoke 55 and other fittings to an air cylinder 56 which may be used to move the drive wheels 52 radially inwardly or outwardly for various pipe sizes and for various degrees of frictional engagement, or disengagement, with the internal walls of the pipe sections 1, 2 in which the clamp apparatus is to be used.

Figure 4:
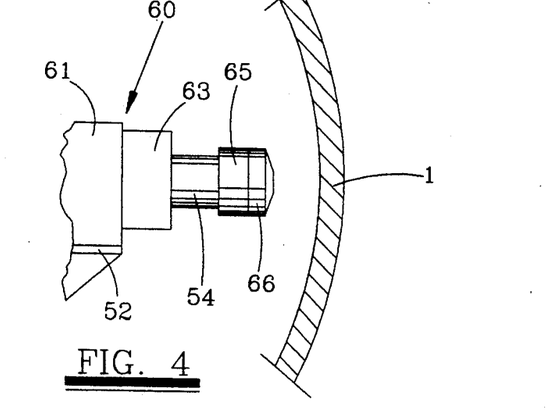
FIG. 4 is a partial cross-sectional view of the pipe line-up clamp of FIG. 1, illustrating a brake assembly thereof.

Mounted between the longitudinal bars 14, 15 on opposite sides of the apparatus A is a pair of brake assemblies 60. These brake assemblies may be made in a number of ways. As illustrated in FIG. 4, one of the brake assemblies 60 comprises a housing 61 attached in some fashion to a support 62 which is attached to frame assembly 10. The housing 61 carries a piston assembly 63 from which projects an extendable and retractable rod 64, a brake pad support 65 and brake pad 66. As shown in FIG. 4, the brake assembly 60 is in the retracted position. However, it is activatable to extend the brake pad 66 into frictional engagement with the interior wall of pipe section 1 to slow or stop movement of the clamp apparatus A therein.

Carried by a bracket 70, attached to support members 13 of the frame assembly 10 is a pivotable shaped stop or locator member 71. The proximal end of the stop member 71 is pivotally connected by a pivot pin 72. The distal end of the stop member 71 has a curved foot portion 73 and a recessed heel stop 74. The stop or locator 71 is biased in a radially outward direction. Due to the shape of the foot portion 73, the stop member 71 is forced radially inward as the nose portion of the clamp apparatus is initially inserted into a pipe section. However, as the nose portion of the apparatus A exits a pipe section, such as pipe section 1, the stop member 71 is biased outwardly to a position such as shown in FIG. 1. If this occurs, reverse movement of the apparatus A within the pipe section 1 would be stopped by the heel recess 74 in the predetermined position of FIG. 1.

Connected by pivot connection 80 to nose member 19 of the frame assemblfy 10 is a lever-like sensor 81. When the apparatus A is within a pipe section, the lever 81 assumes the dotted line position illustrated in FIG. 1. However, as soon as the clamp apparatus A exits a pipe section, the lever 81, being outwardly biased, assumes the solid line position illustrated in FIG. 1. Movement from the dotted line position to the solid line position thus automatically senses when the apparatus A exits the end of a pipe section to which no other pipe section has been welded.

Figure 2:
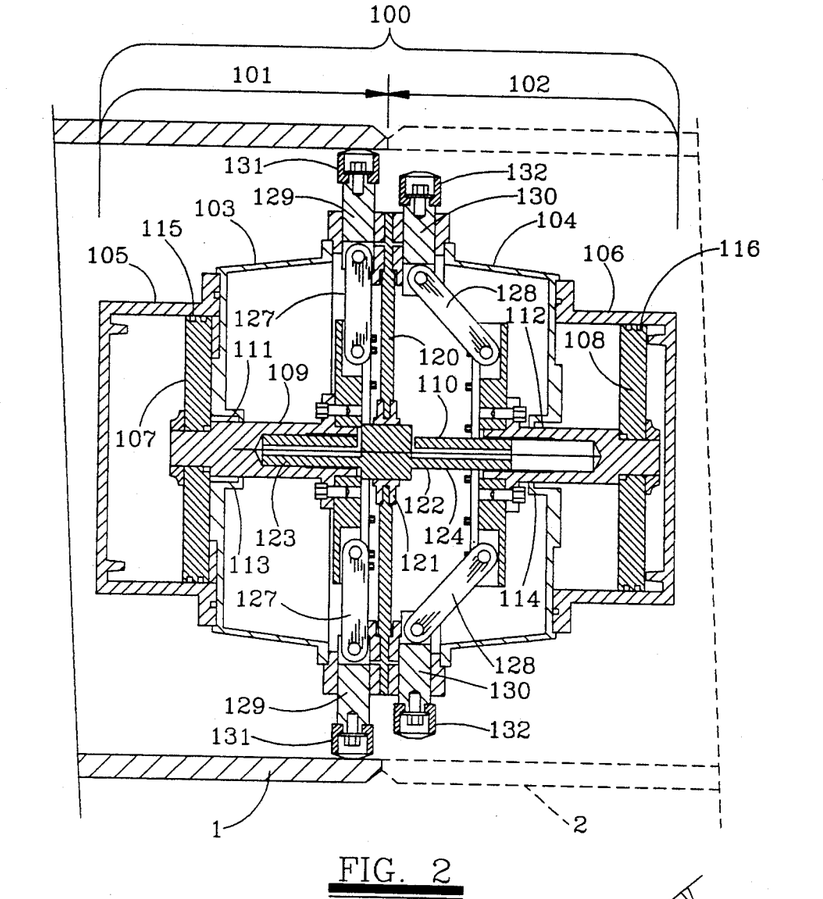
FIG. 2 is a side elevation, in section, showing a composite clamping assembly, including first and second clamps, which is a part of the pipe line-up clamp of FIG. 1, according to a preferred embodiment thereof.

As previously mentioned, a composite clamping assembly 100 is carried between annular plates 12 and 17. Referring also to FIG. 2, the composite clamping assembly 100 is made up of a first clamp 101, generally disposed to the left of FIG. 2, and a second clamp 102 generally disposed to the right of the FIG. 2. Each of the first and second clamps 101, 102 are made up of components which are essentially mirror images of the other. Each of the clamps 101 and 102 include frustoconical housings 103, 104 and piston chambers 105, 106 in which are disposed pistons 107, 108. Each of the pistons 107, 108 is attached to a corresponding shaft assembly 109, 110 which are in reciprocating engagement with seals 111, 112 carried within seal housings 113, 114 which make up part of the housings 103, 104. Of course, annular sliding seals 115, 116 are provided around the pistons 107, 108 for sliding and sealing engagement with the interior of the piston cylinders 105, 106. A circular plate 120 separates the first and second clamps 101 and 102 and provides a central hub 121 which supports a central stabilizer shaft 122, the opposite ends 123, 124 of which engage corresponding cylindrical cavities of shaft assemblies 109, 110 to allow the shaft assemblies 109, 110 to reciprocate thereon between an inward terminal position, as illustrated for the clamp 101, and an outward terminal position, as illustrated for the clamp 102.

Figure 3:
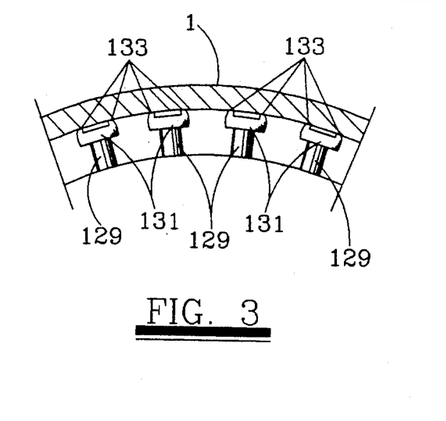
FIG. 3 is a partial cross-sectional view, taken along lines 3—3 of FIG. 2, further illustrating elements of the composite clamping assembly shown in FIG. 2.

Attached to the ends of shaft assemblies 109, 110, opposite their respective pistons 107, 108, are circular support plates 124, 126 around the outer peripheries of which are pivotally attached radially disposed links 127, 128. The opposite end of these links 127, 128 are in turn pivotally attached to radially disposed shafts 129, 130. At each one of these clamp shafts 129, 130 is attached a clamp shoe 131, 132 which is provided with raised frictional engaging surfaces as illustrated at 133 in FIG. 3, for frictionally engaging the interior of the pipe section in which the clamping assembly is located.

Initially, each of the clamps 101, 102 would be disposed in the retracted position illustrated by the second clamp assembly 102 in FIG. 2. However, upon introduction of pressurized air into the piston cylinders 105, 106 on the head side of the pistons 107, 108, the piston will be moved inwardly, such as piston 107 in FIG. 2, forcing the links 127, 128, clamp shafts 129, 130 and clamp shoes 131, 132 into extended positions, such as the extended position illustrated for the clamp 101, for clamping engagement with the interior wall of the pipe section surrounding the clamping assembly 100. As illustrated and described, of course, each of the first and second clamps 101, 102 is independently expandable and retractable.

As previously mentioned, the air from the pressurized air tank 30 may be routed by various conduits and control vavles to the drive motor 53, brake assemblies 60 and the piston cylinders 105, 106 of the first and second clamps. Some of the controls for operation of these various componments may be located in a control box L-1 carried in the nose portion of the frame assembly 10 (see FIG. 1). Other controls may be remotely disposed well forward of the clamping apparatus A and accessible for operation at the opposite end of the pipe section being welded to the pipe line. These remote controls may be connected to the components in the clamp apparatus A by a conduit 37 connectable to the fitting 36. The same conduit may be used to replenish the supply of compressed air in the compressed air tank 30 by connecting the clamp apparatus A with an air compressor at the opposite end of the last section of pipe being welded.

Figure 5:
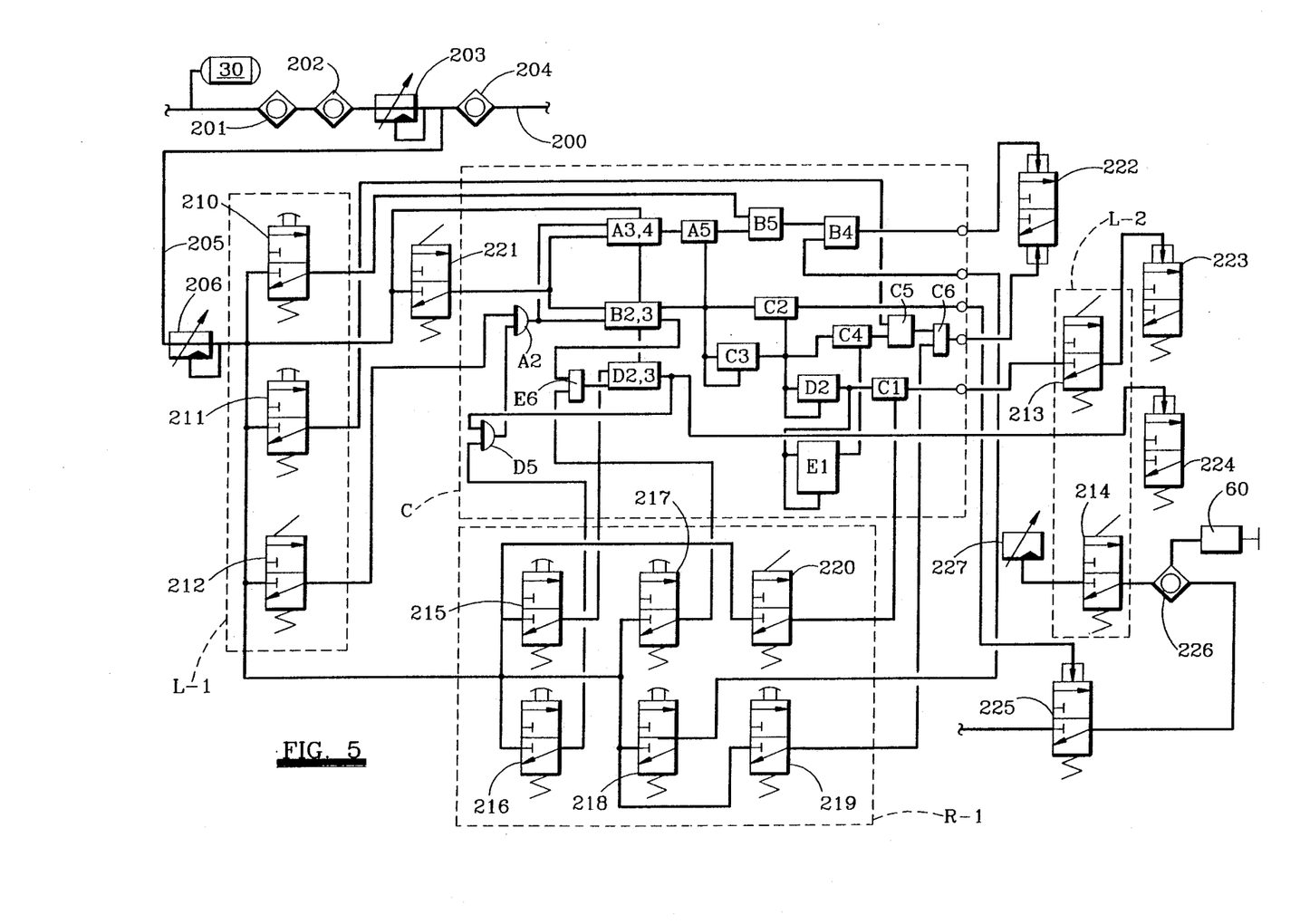
FIG. 5 is a schematic diagram of the pneumatic controls and circuitry of the control devices utilized with the pipe line-up clamp of FIGS. 1-4, according to a preferred embodiment thereof.

Referring now to FIG. 5, the control and operation of the clamp apparatus of the present invention will be described. FIG. 5 is a schematic representation of the air control and logic circuitry by which the apparatus is controlled and operated. Beginning in the upper left hand corner of FIG. 5 there is shown a tank 30 of compressed air. This tank is the tank 30 shown in FIG. 1. Tank 30 is connected to a conduit 200 through which pressurized air is supplied to various power valves, piston and cylinders and drive motors of the apparatus. Before passing to these devices the air is filtered through filters 201, 202 to remove water and other deleterious materials. A regulator 203 is provided to regulate the air at a value of, e.g. 200+ psi. A lubricator 204 may provide lubrication to the air passing to power values and other power devices. Unlubricated control air is provided through a conduit 205, which is connected downstream of regulator 203 but upstream of lubricator 204. Another regulator 206 is provided to maintain the control air at, e.g. 100+ psi.

The regulated control air from regulator 206 is fed to three locations, a local control panel L-1, a remote control panel R-1 and an air logic circuit board C. The local control panel L-1, another local control panel L-2 and the logic circuit board C may all be carried on the frame assembly 10 of the clamp apparatus of FIG. 1. Local control panel L-1 as shown therein represents these items as being carried near the nose of the apparatus A for easy access thereto. The remote control panel R-1 is connected by conduit 207 (perhaps in a bundle with conduit 37 of FIG. 1) at a point well forward of the clamping apparatus A, e.g. forty to sixty feet so that the remote control panel R-1 is accessible to the operator of the clamp apparatus A through a pipe joint, such as pipe joint 2 of FIG. 1, when the clamp apparatus A partially resides in pipe joint 1 and pipe joint 2 as illustrated in FIG. 1.

Local control panel L-1 is provided with two push-button, two-position detented valves 210, 211 and one lever operated, two-position detented valve 212. Local control panel L-2 is provided with two lever operated, momentary spring return, valves 213 and 214. The remote control panel R-1 is provided with five push-button, momentary spring return, valves 215, 216, 217, 218, and 219 and one lever operated, two-position detented valve 220. The valve 221 represents a lever operated, momentary spring return, valve the lever of which corresponds with the sensing element 81 illustrated at the forward end of the clamp apparatus A in FIG. 1.

The logic circuitry C is made up of a number of innerconnected logic control elements which include AND gates A2 and D5, OR gates B5, B4, C5, C6 and E6, NOT gates A5, C2, C4 and C1, Flip-flops A3,4; B2,3; D2,3 and Time Delays C3, D2 and E1.

The control components also include air piloted valves 222, 223, 224, and 225, a two way shuttle valve 226 and regulator 227.

To explain the operation of the clamp apparatus A of the present invention, it will be assumed that the clamping apparatus A is resting at the point where the pipe section 1 of FIG. 1 has just been welded to a previous pipe section, i.e. at the end of pipe section 1 opposite the end shown in FIG. 1. It will also be assumed that both of the clamps 101, 102 of the composite clamp assembly 100 are extended so that they engage the walls of the surrounding pipe sections and that the brake assembly 60 has been retracted so that it's brake pads do not engage the internal walls of the pipe sections. At this point in time, the clamp assembly A would be ready to move forward in pipe section 1 for ultimate positioning at the terminus of pipe section 1 as illustrated in FIG. 1.

To initiate the automatic operation of the apparatus A, the operating button of push-button valve 216 is pushed. Valve 216 may be referred to as the "reset and go" valve. Upon actuation of valve 216, air is routed through AND gates D5 and A2, setting Flip-Flop A3,4 and resetting Flip-Flops B2,3 and Flip-Flops D2,3. Resetting of Flip-Flops B2,3 and D2,3 retracts clamps 101 and 102. The output of Flip-Flop A3,4 travels through NOT gate A5 and OR gates B5, B4 to the piloted valve 222 which is connected to the drive motor (see 53 in FIG. 1) driving the air motor in a forward direction and propelling the clamp apparatus A through pipe section 1. As the clamp apparatus A begins to exit pipe section 1, the sensor lever 81 pivots downwardly, to the solid line position of FIG. 1, shifting the control valve 221 providing a signal which resets Flip-Flop A3,4, interrupting flow of air to the drive motor through valve 222. As this occurs, Flip-Flop B2,3 is set providing a signal through NOT gate C2 and the shuttle valve 225 to direct power pressure through two-way check valve 226, extending the brakes 60 (see also FIGS. 1 and 4) at full pressure. At the same time NOT gate A5 is turned off redundantly stopping the drive motor.

The signal from the Flip-Flop B2,3 also initiates Time Delay C3 which, upon predetermined time delay, turns off NOT gate C2 retracting the brakes 60. In addition, the signal from the Time Delay C3 turns on NOT gate C4 and OR gates C5 and C6 providing a signal to the pilot valve 222 to start the drive motor but in the reverse direction. During this period of time, the stop element 73 will have exited pipe section 1 and pivoted downwardly to the position of FIG. 1. Aas the drive motor reverses movement of the clamp assembly A, the recessed heel 74 engages the end of the pipe section 1 preventing any further reverse direction and aligning the clamp assembly A at a predetermined location.

In addition to providing signals to retract the brakes 60 and to start the air motor in the reverse direction, the time delay C3 provides a signal to initiate Time Delay D2. After a predetermined amount of time, a signal from the Time Delay D2 turns on the NOT gate C1 providing a signal to the piloted valve 223 to extend the rear clamp 101 (see FIG. 2) and extending the clamping dogs thereof into clamping engagement with pipe section 1 as illustrated in FIG. 1. The same signal from the time delay D2 provides a signal to Time Delay E1 which, after a predetermined time, turns off the NOT gate C4 deactuating the pilot control valve 222 and turning off the drive motor connected thereto.

At this point in operation, the apparatus A has been propelled through pipe section 1 until its exit is sensed by the sensor 81 initiating a sequence which includes: deactivation of the drive apparatus, activation of the brake assembly to slow and stop movement of the apparatus in pipe section 1, reactivation of the drive means but in a rearward direction to align the apparatus at a predetermined position within the pipe section 1 and activation of the first clamp for clamping engagement with interior walls of the first pipe section 1.

Next the pipe section 2 is aligned end-to-end with pipe section 1 leaving the requisite welding space therebetween. At this time, the push-button control valve 215 at the remote control panel R-1 would be pushed providing a signal for setting Flip-Flop D2,3 and providing air to the pilot valve 224 to extending the second or forward clamp 102. With both the first and second clamps extended, the pipe sections 1 and 2 would be welded together after which the "reset and go" button 216 could be actuated to repeat the cycle.

Of course, there may be times when operation of various components of the clamp apparatus may need to be done out of sequence and/or individually. The controls of the apparatus allow such operation. For example, when the clamp apparatus A is near the end of pipe section 1 and before pipe section 2 has been brought into place for welding, local control panels L-1 and L-2 allow certain operations. Pushing valve 210 provides a signal through OR gates B5 and B4 to pilot valve 222 to place the drive motor in a forward position or pushing the button of valve 211 would provide a signal through OR gate C5 and C6 to place the drive motor in a reverse drive position. The control valve 212 provides a signal for enabling automatic operation. Operation of valve 214 at the local control panel L-2 can provide air through the two-way shuttle 226 to the brake assemblies 60. The valve 213 can be actuated to release the first clamp 101.

After the pipe section 2 has been brought into place so that the local control panels L-1 and L-2 are no longer accessible, the remote control panel R-1 may be utilized for various operations. As already described, the "reset and go" control valve 216 is used to initiate the automatic cycle in which the clamp assembly A is propelled through the last welded pipe section to begin the procedure for welding another section of pipe thereto. In addition, valve 215 may be actuated providing a signal through Flip-Flop D2,3 to the pilot valve 224 for extending the second clamp assembly 102. Actuation of control valve 217 provides a signal, through OR gate E6, to flip-flop D2,3 interrupting air to the pilot valve 224 and causing the second clamp 102 to be retracted. Activation of the valve 220 provides a signal through NOT gate C1 to the first clamp 101 to retract the same. Push-button valve 218 may be actuated providing a signal through OR gate B4 and pilot valve 222 placing the air motor in a forward drive position. Activation of push-button 219 provides a signal through OR gate C6 to the pilot valve 222 placing the air motor in the reverse drive position.

Thus, the pipe line-up clamp of the present invention provides a unique means of aligning, in end-to-end fashion, first and second sections of pipe for the welding together thereof. The apparatus, carried on a frame assembly, includes first and second clamps for independent expansion and retraction into and out of clamping engagement with the interior walls of the pipe sections; drive means for propelling the apparatus forwardly or rearwardly within the pipe sections and brake means for slowing or stopping movement of the apparatus therein. A unique sensing device is provided for sensing the end of the first pipe section as the apparatus is propelled forwardly therethrough and unique control devices are provided which are responsive upon the sensing of the end of the first pipe section to deactivate the drive means, activate the brake means and activate the first clamp for clamping engagement with the first pipe section. Other control devices are then activated for expanding and retracting the second clamp and for various independent operation of the drive means, brake means and clamps. The pipe line-up clamp of the present invention is much more safe and efficient than those of the prior art. The injuries and Time Delays associated with pipe line-up clamps of the prior art are essentially eliminated. Welding proceeds in a much more efficient manner. Although a single embodiment of the invention has been described herein, many variations thereof may be made without departing from the spirit of the invention. Accordingly, it is intended that the scope of the invention be limited only by the claims below.

We claim:

1. Apparatus for end-to-end alignment of first and second sections of pipe for the welding together thereof, said apparatus comprising:
    a frame assembly for supporting said apparatus within said pipe sections;
    a clamp assembly carried by said frame assembly, and including first and second clamps, each of said clamps being independently expandable for clamping engagement with the interior walls of said pipe sections and independently retractable for disengagement with the interior walls of said pipe section;
    drive means carried by said frame assembly and engageable with the interior walls of said pipe sections for propelling said apparatus forwarding or rearwardly within said pipe section;
    brake means carried by said frame assembly and activateable for frictional engagement with the interior walls of said pipe sections to slow or stop movement of said apparatus therein;
    sensor means for automatically sensing the end of said first pipe section as said apparatus is propelled forwardly through said first pipe section by said drive means; and control means connected to said first and second clamps, said drive means, said brake means and said sensor means and automatically responsive upon the sensing of the end of said first pipe section by said sensor means to deactivate said drive means and activate said brake means to arrest forward movement of said apparatus through said first pipe section.

2. Pipe alignment apparatus as set forth in claim 1 including stop means carried by said frame assembly and engageable with said end of said pipe section, upon deactivation of said brake means and reactivation of said drive means for rearward movement of said apparatus, to align said apparatus at a predetermined position within said first pipe section.

3. Apparatus for end-to-end alignment of first and second sections of pipe for the welding together thereof, said apparatus comprising:

a frame assembly for supporting said apparatus within said pipe sections;

a clamp assembly carried by said frame assembly, and including first and second clamps, each of said clamps being independently expandable for clamping engagement with the interior walls of said pipe sections and independently retractable for disengagement with the interior walls of said pipe section;

drive means carried by said frame assembly and engageable with the interior walls of said pipe sections for propelling said apparatus forwarding or rearwardly within said pipe section;

brake means carried by said frame assembly and activateable for frictional engagement with the interior walls of said pipe sections to slow or stop movement of said apparatus therein;

sensor means for sensing the end of said first pipe section as said apparatus is propelled forwardly through said first pipe section by said drive means;

control means connected to said first and second clamps, said drive means and said brake means and responsive upon the sensing of the end of said first pipe section to deactivate said drive means and activate said brake means to arrest forward movement of said apparatus through said first pipe section; and stop means carried by said frame assembly and engageable with said end of said pipe section, upon deactivation of said brake means and reactivation of said drive means for rearward movement of said apparatus, to align said apparatus at a predetermined position within said first pipe section, said control means being responsive, upon said alignment of said apparatus at said predetermined position, to expand said first clamp for clamping engagement with the interior walls of said first pipe section.

4. Pipe alignment apparatus as set forth in claim 3 in which said control means is responsive, upon subsequent end-to-end alignment of said second pipe section with said first pipe section, to expand said second clamp for clamping engagement with the interior walls of said second pipe section, said first and second pipe sections being held in fixed predetermined relationship for the welding together thereof.

5. Pipe alignment apparatus as set forth in claim 4 in which said control means, after said welding together of said pipe sections and subsequent retraction of said first and second clamps, is responsive to a signal thereto to activate said drive means for propelling said apparatus forwardly through said second section of pipe.

6. Apparatus for end-to-end alignment of first and second sections of pipe for the welding together thereof, said apparatus comprising:

a frame assembly for supporting said apparatus within said pipe sections;

a clamp assembly carried by said frame assembly, and including first and second clamps, each of said clamps being independently expandable for clamping engagement with the interior walls of said pipe sections and independently retractable for disengagement with the interior walls of said pipe section;

drive means carried by said frame assembly and engageable with the interior walls of said pipe sections for propelling said apparatus forwarding or rearwardly within said pipe section;

brake means carried by said frame assembly and activateable for frictional engagement with the interior walls of said pipe sections to slow or stop movement of said apparatus therein;

sensor means for sensing the end of said first pipe section as said apparatus is propelled forwardly through said first pipe section by said drive means; and control means connected to said first and second clamps, said drive means and said brake means and responsive upon the sensing of the end of said first pipe section to deactivate said drive means and activate said brake means to arrest forward movement of said apparatus through said first pipe section, said control means comprising logic circuitry connected to local control devices carried on said frame assembly and remote control devices disposed substantially forward of said frame assembly so that upon said stopping of forward movement of said apparatus at the end of said first pipe section and subsequent end-to-end alignment of said second pipe section said remote control devices are accessible at the end of said second pipe section opposite the end aligned end-to-end with said first pipe section.

7. Pipe alignment apparatus as set forth in claim 6 in which said local control devices include one or more control devices for activating said drive means for propelling said apparatus either forwardly or rearwardly within said pipe sections.

8. Pipe alignment apparatus as set forth in claim 6 in which said remote control devices include one or more control devices for independently expanding or retracting said second clamp and for activating said drive means for propelling said apparatus either forwardly or rearwardly within said pipe sections.

9. Pipe alignment apparatus as set forth in claim 6 in which said remote control device includes a control device which, upon being activated, in cooperation with said logic circuitry, automatically activates said drive means for propelling said apparatus forwardly through said first pipe section until the end of said pipe is sensed by said sensor means, automatically deactivating said drive means and activating said brake means to stop said apparatus and upon predetermined alignment of said apparatus with the end of said first pipe section, automatically expanding said first clamp into clamping engagement with the interior walls of said first pipe section.

10. Pipe alignment apparatus as set forth in claim 9 in which said remote control device includes another control device which, upon being activated, expands said second clamp into clamping engagement with the interior walls of said second pipe section.

11. Pipe alignment apparatus as set forth in claim 1 in which said control means includes one or more control devices which, upon being activated, automatically activates said drive means for propelling said apparatus forwardly through said first pipe section until the end of said pipe is sensed by said sensor means, then automatically deactivates said drive means and activates said brake means to stop said apparatus and upon predetermined alignment of said apparatus with the end of said first pipe section, automatically expands said first clamp into clamping engagement with the interior walls of said first pipe section.

12. Pipe alignment apparatus as set forth in claim 11 in which said control means includes at least one other control device which, upon being activated, expands said second clamp into clamping engagement with the interior walls of said second pipe section.

* * * * *